US008417690B2

(12) United States Patent  
Poppe et al.

(10) Patent No.: US 8,417,690 B2
(45) Date of Patent: Apr. 9, 2013

(54) AUTOMATICALLY AVOIDING UNCONSTRAINED CARTESIAN PRODUCT JOINS

(75) Inventors: Monty C. Poppe, Austin, TX (US); Christian Richter, Toowong (AU)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 12/466,845

(22) Filed: May 15, 2009

(65) Prior Publication Data

US 2010/0293161 A1 Nov. 18, 2010

(51) Int. Cl.
G06F 17/30 (2006.01)

(52) U.S. Cl.
USPC .......................................... 707/714; 707/713

(58) Field of Classification Search .................. 707/713, 707/714
See application file for complete search history.

(56) References Cited

U.S. PATENT DOCUMENTS

| | | | | |
|---|---|---|---|---|
| 5,761,654 | A * | 6/1998 | Tow | 1/1 |
| 6,496,819 | B1 * | 12/2002 | Bello et al. | 1/1 |
| 6,516,310 | B2 | 2/2003 | Paulley | |
| 6,980,981 | B2 | 12/2005 | Beavin et al. | |
| 2002/0078015 | A1 | 6/2002 | Ponnekanti | |
| 2002/0116357 | A1 | 8/2002 | Paulley | |
| 2005/0160102 | A1 * | 7/2005 | Abdo et al. | 707/100 |
| 2005/0177557 | A1 | 8/2005 | Ziauddin et al. | |
| 2006/0047638 | A1 * | 3/2006 | Dettinger et al. | 707/3 |
| 2006/0074901 | A1 | 4/2006 | Pirahesh | |
| 2006/0235834 | A1 * | 10/2006 | Blakeley et al. | 707/4 |
| 2006/0271529 | A1 * | 11/2006 | Dhamija et al. | 707/4 |
| 2008/0016038 | A1 | 1/2008 | Moestl | |
| 2009/0037365 | A1 * | 2/2009 | Sinclair et al. | 707/2 |

OTHER PUBLICATIONS

Codd, E. F., "The Relational Model for Database Management: Version 2", http://portal.acm.org/citation.cfm?id=SERIES11430. 77708 Addison-Wesley Longman Publishing Co., Inc. 1990.

Du, Kaizheng, "On Automated Query Modification Techniques for Databases", http://www.ohiolink.edu/etd/send-pdf.cgi?acc_num=case1056994739 Doctoral Thesis, Case Western Reserve University 1993.

* cited by examiner

Primary Examiner — Mahesh Dwivedi
(74) Attorney, Agent, or Firm — DeLizio Gilliam, PLLC

(57) ABSTRACT

Database queries for retrieving data from database tables, that do not impose any constraints on the data to be retrieved, result in Cartesian product joins. Such unconstrained database queries when executed impose a significant load on resources, take a long time to execute, and may produce inaccurate and misleading results. Functionality can be implemented to reduce the amount of data retrieved by constraining database queries resulting in Cartesian product joins before they are executed. This can be done by leveraging referential constraints that depict relationships between the tables to be joined to limit the results produced by executing the Cartesian product join. Automatically detecting and preventing execution of Cartesian product joins by leveraging the referential constraints can reduce the processing load on the machine, reduce the time spent in executing the database query, minimize the number of query results, and prevent inaccurate results from being displayed.

20 Claims, 5 Drawing Sheets

US 8,417,690 B2

AUTOMATICALLY AVOIDING UNCONSTRAINED CARTESIAN PRODUCT JOINS

BACKGROUND

Embodiments of the inventive subject matter generally relate to the field of databases, and more particularly, to automatically avoiding Cartesian product joins.

A database is an ordered collection of data. The data in the database is typically logically stored as a series of rows and columns in one or more tables that comprise the database. Database queries comprise one or more query statements to access one or more rows of data in the database tables. The database queries may also be constrained to restrict the amount of data that is retrieved and presented.

SUMMARY

Embodiments include a method comprising determining that a Cartesian product join should be automatically avoided for a database query. An execution data structure indicates how to implement the database query on a database. While constructing the execution data structure, it is determined that implementing the database query in accordance with a current state of the execution data structure will result in a Cartesian product join. A referential constraint between data sources indicated in the database query is identified. The current state of the execution data structure is modified to leverage the identified referential constraint to avoid the Cartesian product join. The construction of the execution data structure is completed using the modified current state of the execution data structure.

Another embodiment includes machine-readable media containing a program product, which when executed by a processor unit causes the processor unit to perform operations for determining that a Cartesian product join should be automatically avoided for a database query. The operations comprise determining, while constructing an execution data structure that indicates how to implement the database query on a database, that implementing the database query in accordance with a current state of the execution data structure will result in a Cartesian product join. The operations also comprise identifying a referential constraint between data sources indicated in the database query, modifying the current state of the execution data structure to leverage the identified referential constraint to avoid the Cartesian product join, and completing construction of the execution data structure with the modified current state of the execution data structure.

Another embodiment includes an apparatus comprising a processor, a network interface coupled with the processor, a set of one or more data sources operable for hosting data, and a Cartesian join replacement unit. The Cartesian join replacement unit is configured to determine that a Cartesian product join should be automatically avoided for the database query and begin construction of an execution data structure that indicates how to implement the database query on a database. The Cartesian join replacement unit is also configured to determine, while constructing the execution data structure, that implementing the database query in accordance with a current state of the execution data structure will result in a Cartesian product join. The Cartesian join replacement unit is also configured to identify a referential constraint between data sources indicated in the database query, modify the current state of the execution data structure to leverage the identified referential constraint to avoid the Cartesian product join, and complete construction of the execution data structure with the modified current state of the execution data structure.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
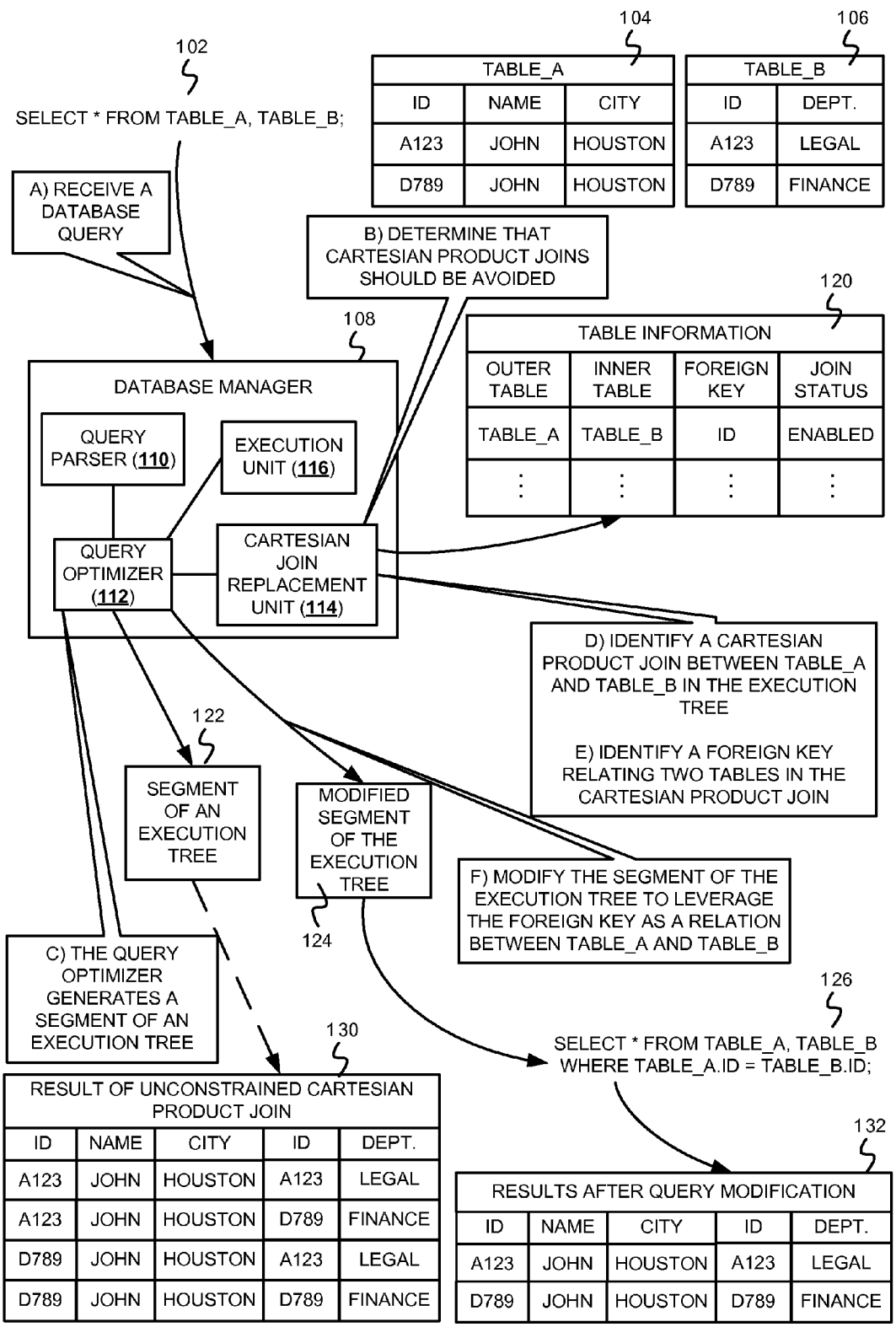
FIG. 1 is an example conceptual diagram illustrating operations for avoiding execution of unconstrained Cartesian product joins in a database query.

The description that follows includes exemplary systems, methods, techniques, instruction sequences, and computer program products that embody techniques of the present inventive subject matter. However, it is understood that the described embodiments may be practiced without these specific details. For instance, although examples refer to database queries using structured query language (SQL) to access one or more relational databases, embodiments can also refer to various other types of databases (e.g., XML database, schema-less databases) and other querying languages (e.g., XML queries). In other instances, well-known instruction instances, protocols, structures, and techniques have not been shown in detail in order not to obfuscate the description.

A typical database query to retrieve data from two tables is of the form "SELECT * FROM table1, table2". Execution of the database query results in a Cartesian product join. However, such a database query that does not identify and impose any constraints on the data to be retrieved imposes a significant load on resources, when executed. Such an unconstrained database query resulting in an unconstrained Cartesian product join also takes a long time to execute because the number of rows in a resultant unconstrained Cartesian product join is the product of the number of rows in each table.

A database query comprising an unconstrained Cartesian product join is typically an error on the part of a querying entity (e.g., a user, a database administrator, a programmer who programmed an application, etc). For example, it is not uncommon for a database administrator to request data from two tables where each table comprises over a million rows. The amount of resources (e.g., central processing unit (CPU) power, memory, input-output (I/O) resources, etc.) and time spent in retrieving, appending information in one table with the information in the other table, and presenting over $10^{12}$ rows of data can be prohibitive. Moreover, certain data combinations obtained as a result of the Cartesian product join may be inaccurate and may mislead a querying entity (e.g., a user, database administrator, a querying application, etc).

Referential constraints that depict relationships between two or more tables involved in the Cartesian product join can be used to limit the results produced by executing the Cartesian product join. The amount of data retrieved can be reduced by constraining the Cartesian product join statement before it is executed. This can be done by leveraging the relationships between the two or more tables involved in the Cartesian product join. Such techniques that detect and prevent execution of Cartesian product joins by leveraging the referential constraints can reduce the processing load on the machine executing the database query, and reduce the time spent in executing the database query. Such techniques for avoiding Cartesian product joins can also minimize the number of query results and prevent inaccurate results from being displayed.

FIG. 1 is an example conceptual diagram illustrating operations for avoiding execution of unconstrained Cartesian product joins in a database query. FIG. 1 depicts a database manager 108 and two tables—table_A 104 and table_B 106, from which data is retrieved. The database manager 108 comprises a query optimizer 112, a query parser 110, a Cartesian join replacement unit 114, and an execution unit 116. The query optimizer 112 is coupled with the query parser 110, the Cartesian join replacement unit 114, and the execution unit 116.

The database manager 108 performs various operations on databases (e.g., operations to retrieve, add, delete, and update data). The database manager 108 may also perform maintenance operations on the databases. At stage A, the database manager 108 receives a database query 102 from a querying entity. The database query 102 comprises an implicit Cartesian product join statement to select and jointly retrieve data from table_A 104 and table_B 106. The database query 102 can also be depicted as an explicit Cartesian product join such as "SELECT * FROM table_A JOIN table_B".

At stage B, the Cartesian join replacement unit 114 determines that Cartesian product joins should be avoided. For example, the Cartesian join replacement unit 114 may access table information 120 and determine whether unconstrained Cartesian product joins should be replaced. In FIG. 1, the table information 120 indicates that Cartesian product joins between table_A 104 and table_B 106 should be avoided (denoted by an ENABLED join status). In some implementations, a flag may be set to indicate that Cartesian product joins should be detected and avoided. The flag may be stored as part of the table information 120, the database tables 104 and 106, a configuration file on the querying entity (not shown), etc. The table information 120 may be stored as part of table_A 104 and/or table_B, databases to which table_A 104 and table_B 106 belong, etc.

At stage C, the query optimizer 112 begins generating an execution tree 122. In some implementations, the query parser 110 parses the received database query and ensures that the syntax of query statements in the database query 102 is accurate (e.g., number and data type of parameters, keywords, etc). The query parser 110 may also determine whether databases, database tables, columns of the database tables, etc., referenced in the database query exist. If the database query 102 comprises query statements to modify the database tables, the query parser 110 may determine whether the querying entity is allowed to modify the database tables. The query optimizer 112 receives the parsed and validated query statements and generates the execution tree 122 indicating an optimal solution for executing the database query 102 based in part on a database model and statistics about the data.

The execution tree 122 indicates how the execution unit 116 should implement the database query 102. The execution tree 122 comprises a series of interconnected nodes and symbols (e.g., for selecting tables, rows from tables, table scan, etc). Each node represents a database table that is to be accessed while executing the database query 102. The nodes may be connected by one or more edges. In the example of FIG. 1, the database query 102 comprises a single query statement to jointly select and present data from table_A 104 and table_B 106. The query optimizer 112 can generate an initial execution tree 122 comprising two nodes—a first node representing table_A 104 and a second node representing table_B 104. Any one or more of a number of edges, thickness of connecting edges, a weight associated with the connecting edges, etc., can indicate a number of data accesses between nodes (i.e., tables) and amount of data being retrieved from the tables. For example, a thick double line between two nodes can represent a one-to-many relationship between two tables and can indicate a Cartesian product join between the two tables. Alternately, the query optimizer 112 may generate a graphical plan in a tabular or text format.

The query optimizer 112 can generate and update the execution tree 122 on a statement-by-statement basis. For example, the query optimizer 112 can generate a first set of one or more execution steps for executing a first query statement. The query optimizer 112 can then generate a first segment of the execution tree based on a first execution step. As shown in FIG. 1, at stage C, the query optimizer 112 generates a segment of the execution tree 122. After the Cartesian join analyzes and modifies (if required) the first segment of the execution tree, the query optimizer 112 can generate a second segment of the execution tree based on a second execution step associated with the first query statement. Thus, the query optimizer 112 can generate a segment of the execution tree for each set of execution steps associated with each query statement in the received database query.

At stage D, the Cartesian join replacement unit 114 analyses the generated segment of the execution tree 122 and identifies a potential Cartesian product join between table_A 104 and table_B 106. In some implementations, the Cartesian join replacement unit 114 can analyze the segment of the execution tree 122 while it is being generated (e.g., at stage C). For example, the Cartesian join replacement unit 114 may analyze the first segment of the execution tree 122 after the query optimizer 112 generates the first segment of the execution tree based on the first execution step of the first query statement. In analyzing the execution tree 122, the Cartesian join replacement unit 114 may determine a one-to-many relationship between two or more nodes in the execution tree 122. In one implementation, the Cartesian join replacement unit 114 can identify a Cartesian product join based on a number of connecting edges between two nodes. In another implementation, the Cartesian join replacement unit 114 can identify a Cartesian product join if the weight associated with a connecting edge is greater than a predefined threshold value.

The execution tree 122 can also indicate whether a referential constraint is being leveraged as part of the Cartesian product join. The Cartesian join replacement unit 114 can analyze the execution tree 122 and determine that the tables to be joined are not constrained by a referential constraint. At stage E, the Cartesian join replacement unit 114 accesses the table information 120 and determines whether a referential constraint relating table_A 104 and table_B 106 exists. The table information 120 indicates that the "id" column is a foreign key referential constraint relating table_A 104 and table_B 106. In one implementation, referential constraint information (e.g., referential constraint name, tables related by the referential constraint, etc.) may be stored as part of either or both the tables to be joined. In another implementation, the referential constraint information may be stored as part of a separate entity (e.g., a configuration file on the querying entity, a database table comprising a record of referential constraints, etc). In some implementations, the referential constraint may not be explicitly identified. The Cartesian join replacement unit 114 may analyze the tables to be joined, determine whether the tables can be related, and determine whether a referential constraint exists. For example, the Cartesian join replacement unit 114 may determine that both the tables to be joined comprise a column with the same name. The Cartesian join replacement unit 114 may also determine that the columns, in the tables to the joined, with the same name comprise identical values. The Cartesian join replacement unit 114 can use the identified column as a referential constraint to relate the tables to be joined.

At stage F, the Cartesian join replacement unit 114 directs the query optimizer 112 to modify the segment of the execution tree 122 whose execution results in the Cartesian product join. The query optimizer 112 may modify the execution tree 122 by generating and depicting additional execution steps to leverage the relationship between table_A 104 and table_B 106 indicated by the referential constraint. The query optimizer 112 can modify the execution tree 122, to generate a modified execution tree 124, by depicting a relationship (e.g., a connecting line depicting the relationship, an identification number associated with the referential constraint, etc.) between table_A 104 and table_B 106. The modified execution tree 124 reflects an execution plan to execute modified database query 126. The modified database query 126 leverages the foreign key referential relationship between table_A 104 and table_B 106. In some implementations, the query optimizer 112 may generate the modified segment of execution tree 124 as a separate tree structure (i.e., without revising the initial segment of the execution tree 122).

The modified execution tree 124, comprising execution steps for executing the database query 102, is transmitted to the execution unit 116. The execution unit 116 executes the database query (e.g., retrieves, adds, modifies, deletes data, performs maintenance operations, etc.) in accordance with the modified execution tree 124. A comparison between results 130 of executing the database query 102 with the Cartesian product join and results 132 after the modified database query 126 is executed is also depicted. Avoiding an unconstrained Cartesian product join statement in the database query can yield accurate results and may utilize fewer machine resources.

It should be noted that FIG. 1 is an example and should not be used to limit the scope of the embodiments. For example, although FIG. 1 depicts the database query 102 as comprising a single query statement for selecting data from two tables, the database query can comprise a plurality of query statements for selecting data from more than two tables across one or more databases. The database query can also comprise query statements for adding, deleting, and updating data in database tables, storing the retrieved data, using a part or all of the retrieved data as input for another database query, etc. The process of generating a set of execution steps associated with a query statement, generating a segment of the execution tree for each of the execution steps, analyzing the generated segments of the execution tree, and avoiding Cartesian product joins (if any) continues until the query statement(s) in the database query have been analyzed.

In some implementations, the Cartesian join replacement unit 114 may be implemented as part of the execution unit 116. The query optimizer 112 may construct an entire execution tree based on the database query, without the Cartesian join replacement unit 114 analyzing the execution tree to identify Cartesian product joins. During execution, the Cartesian join replacement unit 114 may dynamically analyze each segment of the execution tree, identify Cartesian product joins, identify a referential constraint relating the tables involved in the Cartesian product join, and accordingly direct the execution unit 116 to modify execution procedures by leveraging the referential constraint.

Also, in some implementations, a user may have an option of globally enabling or disabling the Cartesian join replacement unit 114. In other words, the user may have an option of enabling or disabling operations to identify and avoid unconstrained Cartesian product joins. If operations for avoiding Cartesian product join are disabled, the query optimizer 112 may generate and directly transmit the execution tree to the execution unit 116 for execution without analysis by the Cartesian join replacement unit 114.

The user may also have an option of selectively enabling or disabling the Cartesian join replacement unit 114 for different combinations of tables. For example, the user may enable the Cartesian join replacement unit 114 to avoid Cartesian product joins between table A and table B. As another example, the user may disable the Cartesian join replacement unit 114 to allow Cartesian product joins between table A and table C. The Cartesian join replacement unit 114 may, but not necessarily, access table information 120, every time the Cartesian join replacement unit 114 identifies a Cartesian product join, to determine whether Cartesian product joins should be avoided.

Figure 2:
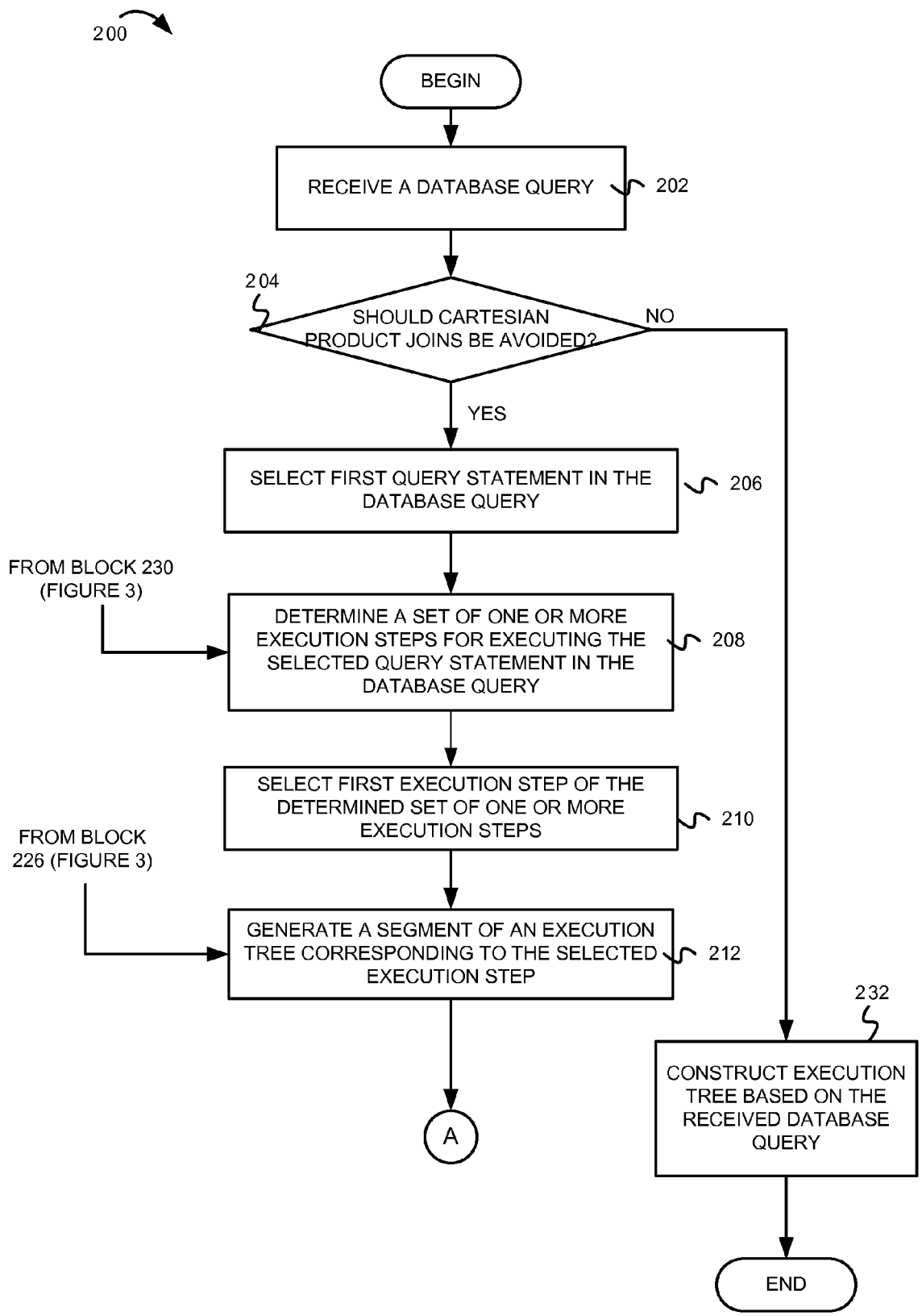
FIG. 2 is a flow diagram illustrating example operations for avoiding execution of unconstrained Cartesian product joins in a database query.
Figure 3:
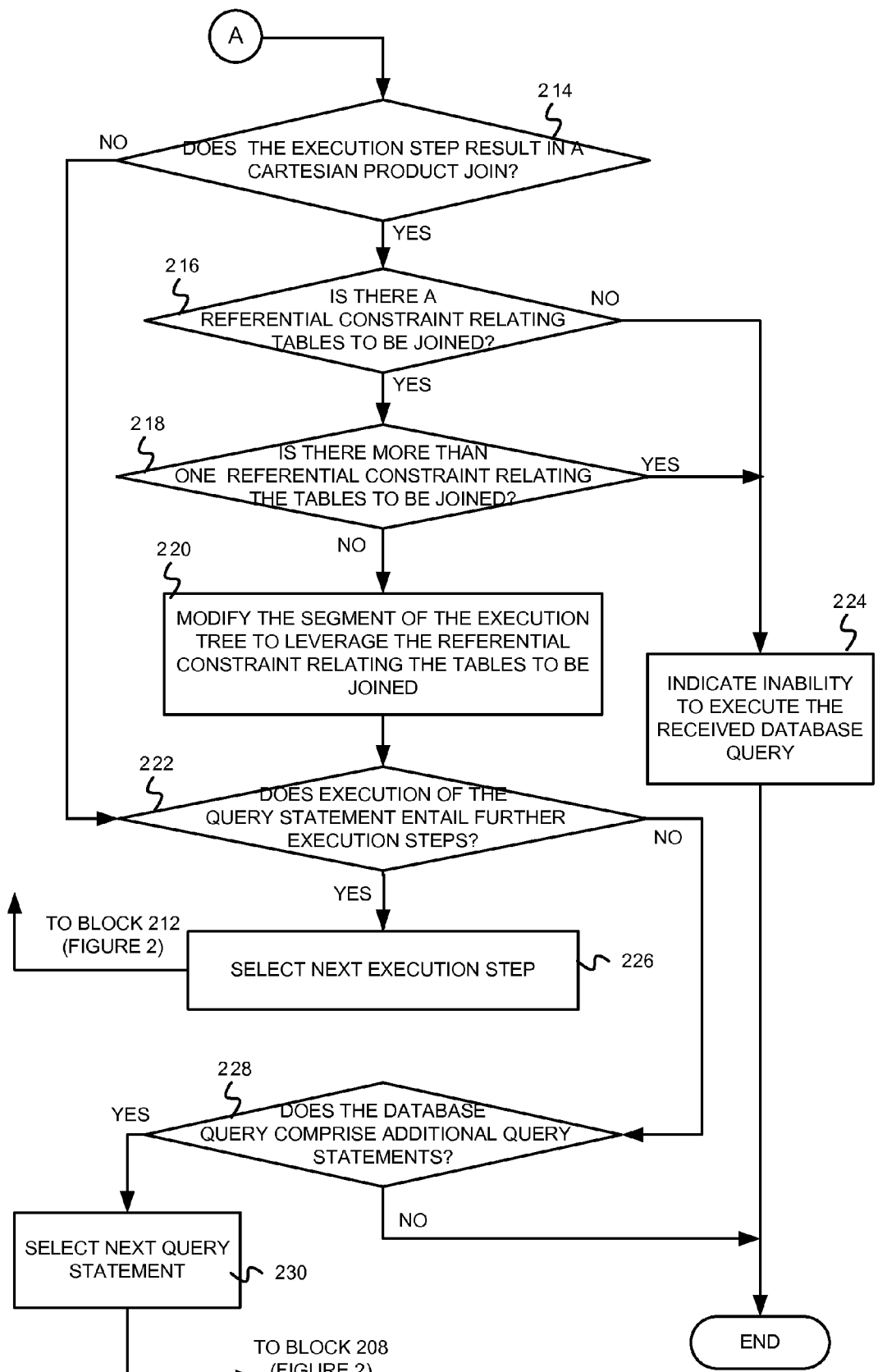
FIG. 3 is a flow diagram illustrating example operations for avoiding execution of unconstrained Cartesian product joins in a database query.

FIG. 2 and FIG. 3 depict a flow diagram illustrating example operations for avoiding execution of unconstrained Cartesian product joins in a database query. Flow 200 begins at block 202 in FIG. 2.

At block 202, a database query is received. For example, a database manager 108 of FIG. 1 may receive the database query. A querying entity such as a user, a database administrator, a querying application, an operating system, etc. may generate the database query. The database query may comprise one or more query statements to retrieve data from one or more tables across one or more databases. Additionally, the database query may comprise query statements to add, delete, or modify data in the one or more tables. The flow continues at block 204.

At block 204, it is determined whether Cartesian product joins (if any) in the received database query should be avoided. Cartesian product joins between two or more tables without a referential constraint identifying a relationship between the two or more tables can generate a large number of unwanted results. Such Cartesian product joins can also misrepresent information by presenting incorrect combinations of data from the two or more tables and may consume a large amount of machine resources (e.g., memory, CPU, I/O, etc.) in executing the database query. In some implementations, the user can globally enable or disable operations to avoid Cartesian product joins. For example, the user may set a flag, during system configuration, to indicate that Cartesian product joins should be avoided. In other implementations, the user may indicate, as part of the database query, whether Cartesian product joins in the database query should be detected and avoided. For example, as part of the database query, the user may type a statement such as "Set Cartesian_products (Enabled)" to enable operations for detecting and avoiding Cartesian product joins in subsequent query statements in the database query. The user may also have an option of selectively enabling and disabling operations for avoiding Cartesian product joins based on tables involved in the Cartesian product join. Information indicating whether operations for avoiding Cartesian product joins should be enabled may be stored as part of the database tables or as a separate entity (e.g., a configuration file on a server, a separate database table, etc). If it is determined that Cartesian product joins in the database query should be avoided, the flow continues at block 206. Otherwise, the flow continues at block 232.

At block 232, the execution tree is constructed based on the received database query. Because it was determined (at block 204) that Cartesian product joins should not be avoided, the execution tree or segments of the execution tree are not analyzed to identify Cartesian product joins. The execution tree comprising Cartesian product joins (if any) is executed without any modifications (e.g., by the execution unit 116 of FIG. 1). From block 232, the flow ends.

At block 206, a first query statement in the database query is selected. As described earlier, the database query can comprise one or more query statements. It may also be determined whether the first query statement follows a prescribed syntax, whether objects (e.g., databases, tables) referenced in the first query statement exist, etc. The flow continues at block 208.

At block 208, a set of one or more execution steps for executing the selected query statement in the database query is determined. For example, in executing an SQL query statement for selecting all rows and all columns from three tables (e.g., select * from table_A, table_B, table_C), a query optimizer may first determine an order in which the three tables should be accessed and joined. The set of execution steps may also include steps for accessing the tables (e.g., table scan, using indexes), etc. The number of execution steps may vary depending on the complexity of the database query statement. For example, an SQL query for selecting all data from a single table may comprise a single execution step. As another example, an SQL query for selecting data from four tables, subject to multiple constraints, and creating a new table comprising the selected data may comprise multiple execution steps. The flow continues at block 210.

At block 210, a first execution step of the determined set of one or more execution steps is selected. The flow continues at block 212.

At block 212, a segment of an execution tree, corresponding to the selected execution step, is generated. The execution tree comprises a series of interconnected nodes and symbols. Each node represents a database table to be accessed as part of the database query. The nodes in the execution tree may reference other tables in the same database or tables in different databases. Symbols in the execution tree can denote selecting data, relationships between the tables, etc. The nodes and symbols are connected to each other by edges. The thickness, weight, and/or number of interconnecting edges can indicate a number of table accesses and amount of data transferred between the tables. The flow continues at block 214 in FIG. 3 (denoted by connector A).

FIG. 3 depicts a flowchart of example operation that continues from FIG. 2. At block 214, it is determined whether execution of the selected execution step associated with the query statement results in a Cartesian product join. The execution tree can be used to identify interactions and relationships between two or more tables across one or more databases. The properties (e.g., thickness, weight, etc.) of the connecting edges in the execution tree can be used to determine whether a Cartesian product join exists between tables (represented as nodes in the execution tree). For example, a Cartesian product join between the tables may be identified by determining that a weight associated with a connecting edge is above a predefined threshold weight. As another example, multiple connecting edges between nodes can indicate a one-to-many relationship and thus a Cartesian product join between the nodes. If a Cartesian product join is identified, the flow continues at block 216. Otherwise, the flow continues at block 222.

At block 216, it is determined whether a referential constraint, relating the tables involved in the identified Cartesian product join, exists. The execution tree may be used to identify the referential constraint relating the tables to be joined. The referential constraint can be one or more or a foreign key, a primary key, or other reference used to indicate a relationship between the tables to be joined. Alternately, information identifying the referential constraint may be stored as part of the database, as part of one or more of the tables to be joined, or as part of a separate data store (e.g., the table information data store 120 of FIG. 1). If it is determined that there exists a referential constraint relating the tables to be joined, the flow continues at block 218. Otherwise, the flow continues at block 224.

At block 218, it is determined whether there exists more than one referential constraint relating the tables involved in the Cartesian product join. For example, a primary key in a first table may be a foreign key in a second table and a primary key in the second table may be a foreign key in the first table. Thus, the primary keys of the first and the second tables can be used a referential constraints to relate the two tables. If it is determined that more than one referential constraint relating the tables to be joined exists, the flow continues at block 224. Otherwise, the flow continues at block 220.

At block 220, the segment of the execution tree corresponding to the selected execution step is modified to leverage the referential constraint. The segment of the execution tree may be modified to reflect additional execution steps for indicating and utilizing the relationship between the tables to be joined. The relationship between the nodes (i.e., the tables to be joined) may be depicted by a connecting edge between the nodes identifying the relationship (e.g., a dashed line connecting two nodes may indicate a relationship between the nodes), a change in the properties of the connecting edges (e.g., number, thickness, and weight of the connecting edges, etc.), associating a referential constraint identifier with the connecting edges, etc. The flow continues at block 222.

At block 222, it is determined whether execution of the selected query statement entails further execution steps. If it is determined that there exist additional execution steps associated with the selected query statement, the flow continues at block 226. Otherwise, the flow continues at block 228.

At block 226, a next execution step corresponding to the selected query statement is retrieved. A next segment of the execution tree corresponding to the retrieved execution step is generated. The generated segment of the execution tree may be appended to the previous segments of the execution tree. The execution tree may also be modified to reflect the next execution step. The flow continues at block 212 in FIG. 2.

At block 228, it is determined whether the database query comprises additional query statements to be executed. If it is determined that another statement in the database query exists, the flow continues at block 230. Otherwise, the flow ends.

At block 230, the next query statement in the database query is retrieved. As described earlier, the retrieved query statement may also be parsed, checked for errors in syntax (e.g., number of parameters, keywords), etc. A set of execution steps, based on the retrieved query statement, is generated. Segments of the execution tree associated with the execution steps for the next query statement may be appended to segments of the execution tree associated with the execution steps for the previous query statement. In some implementations, a separate execution tree may be generated for every query statement. The flow continues at block 208 in FIG. 2.

At block 224, an inability to execute the Cartesian product join is indicated. A server, the database manager 108, or a Cartesian join replacement unit 114 of FIG. 1 may indicate an inability to execute the database query because of a lack of referential constraints or an excess of referential constraints relating the tables to be joined. A configuration file comprising a set of rules dictating how such error events should be handled may be associated with the database manager. The user may configure the configuration file by selecting an error solution from a list of possible solutions.

The flow 200 moves from block 216 to block 224 if it is determined that operations to avoid Cartesian product joins are enabled and a referential constraint relating the tables to be joined does not exist. In one implementation, an error indicating that detected Cartesian product joins cannot be avoided may be presented. The database query comprising the Cartesian product joins may also be discarded and an error notifying the user of the discarded database query may be presented. In another implementation, the database query may be executed without leveraging any referential constraint. In other words, the database query may not be discarded and an unconstrained Cartesian product join may be executed.

The flow 200 also moves from block 218 to block 224 if it is determined that more than one referential constraint relating the two tables to be joined exists. In one implementation, the database query may be discarded and an error indicating inability to execute the database query may be presented. In another implementation, one of the identified referential constraints may be selected (e.g., at random, based on an indicated user preference). The execution tree may be modified to leverage the selected referential constraint. In another implementation, multiple versions of the execution tree structure may be generated, where each version of the execution tree structure corresponds to one of the identified referential constraints. Thus, multiple sets of results may be presented where each set of results leverages one of the identified referential constraints. In another implementation, the identified referential constraints maybe presented, and the user may be prompted to select one of the referential constraints to relate the tables. In other implementations, an unconstrained Cartesian product join may be executed. From block 220, the flow ends.

It should be noted that the operations described in the flow diagrams are examples meant to aid in understanding embodiments, and should not be used to limit embodiments or limit scope of the claims. Embodiments may perform additional operations, fewer operations, operations in a different order, operations in parallel, and some operations differently. For example, although the flow diagrams describe operations for accessing data in databases with a relational database model, the operations can be implemented on databases with various other database models such as hierarchical database models, network model, an XML database, a column oriented database, a Resource Description Framework (RDF) data store, etc. In some implementations, the database may not be based on a database model (e.g., a schema-less database) or may be based on a combination of two or more database models. Also, any suitable query language (e.g., SQL, XML, etc.) can be used to process the data in the databases.

In some implementations, a segment of the execution tree associated with an execution step may be generated after it is determined whether the execution step results in a Cartesian product join and after the referential constraints have been identified (blocks 214-218). In other words, operations for generating a segment of the execution tree as described by block 212 may be implemented after operations described by blocks 214-218 and block 224 are implemented. This precludes modifying a previously generated segment of the execution tree (block 220).

Also, in some implementations, operations for detecting a Cartesian product join, identifying a referential constraint, and modifying the execution tree to leverage the referential constraint (blocks 214-220, and block 224) may not be performed as part of the process of generating the execution tree. Instead, the entire execution tree may be generated prior to detecting the Cartesian product joins. During execution, the execution tree may be traversed and one or more segments in the execution tree whose execution could result in Cartesian product joins may be detected. The detected segments of the execution tree may be modified in accordance with the referential constraints that relate tables to be joined.

The flow diagrams (FIGS. 2-3) depict operations for identifying and avoiding Cartesian product joins being performed after each execution tree segment associated with an execution step is created. However, in some implementations, the operations for identifying and avoiding Cartesian product joins may be performed after the execution tree (or part of the execution tree) is generated for a query statement (comprising one or more execution steps). In some implementations, before an execution tree is generated, an execution tree cache may be accessed. The execution tree cache may comprise execution trees for previously executed database queries. It may be determined whether the received database query comprises one or more query statements that have been received and executed in the past. A previously executed execution tree or part of the previously executed execution tree may be used to generate a new execution tree. For example, the received database query may comprise a query statement to access and present data from three tables. It may be determined that a previous database query (with an execution tree in the cache) comprises the same query statement to select the same data from the same three tables. Instead of generating a new set of execution steps and execution tree for the received database query, the cached execution tree may be retrieved and used in the execution tree for the received database query.

Figure 4:
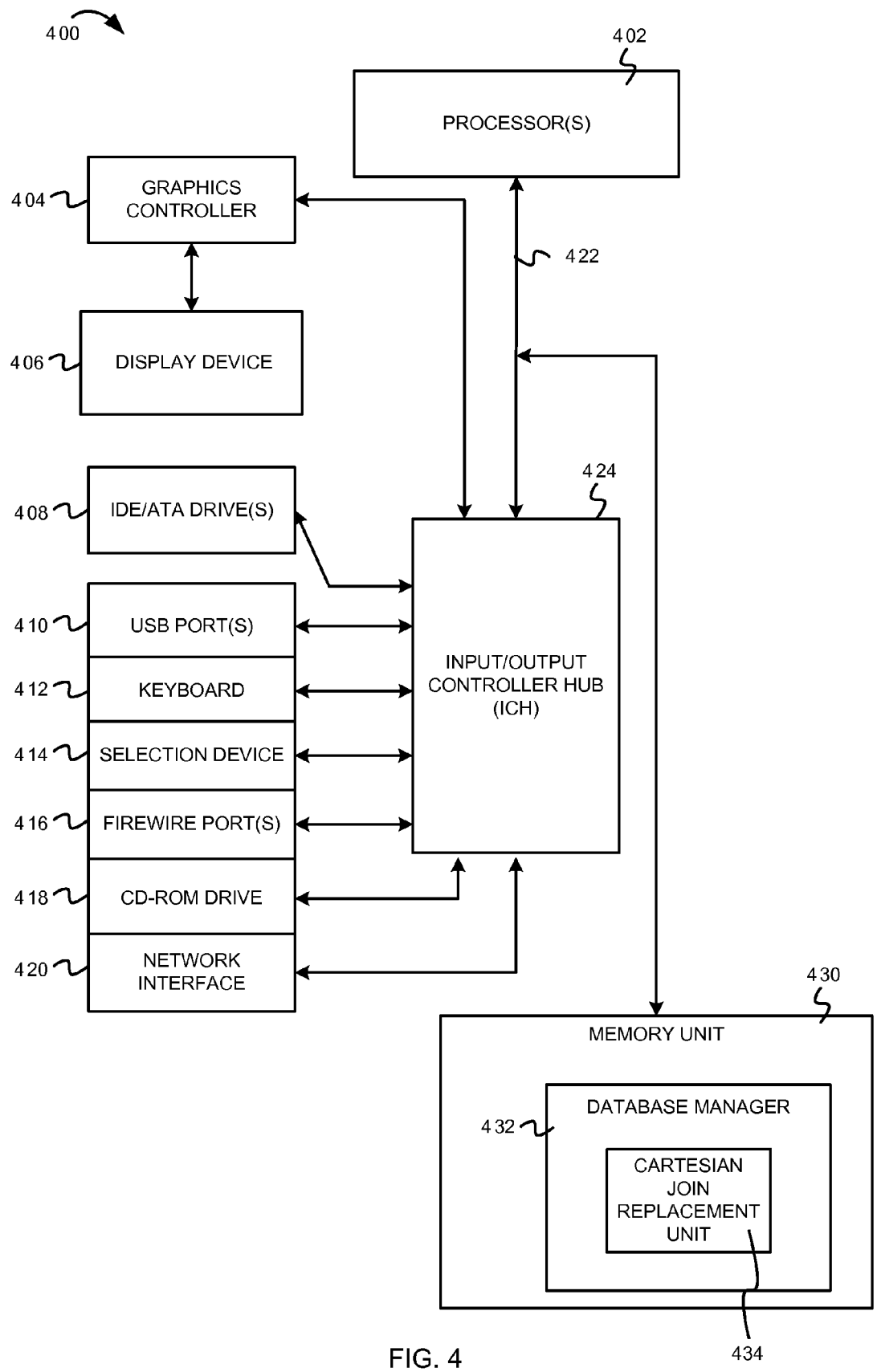
FIG. 4 depicts an example computer system configured to automatically avoid Cartesian product joins in a database query.

FIG. 4 is an example computer system configured to automatically avoid Cartesian product joins in a database query. The computer system 400 includes a processor 402. The processor 402 is connected to an input/output controller hub 424 (ICH), also known as a south bridge, via a bus 422 (e.g., PCI, ISA, PCI-Express, HyperTransport, etc). A memory unit 430 interfaces with the processor 402 and the ICH 424. The main memory unit 430 can include any suitable random access memory (RAM), such as static RAM, dynamic RAM, synchronous dynamic RAM, extended data output RAM, etc The memory unit 430 comprises a database manager 432. The database manager 432 comprises a Cartesian join replacement unit 434. Additionally, the database manager 432 may comprise other units such a query parser, a query optimizer, an execution unit, etc. for respectively performing operations such as parsing an input database query, generating an optimal execution tree, executing the database query, etc. The Cartesian join replacement unit 434 implements functionality to automatically detect and avoid execution of one or more Cartesian product joins in the database query. In one implementation, the database manager 432 generates a set of execution steps associated with a database query. The database manager 432 also generates a segment of the execution tree for each set of execution steps associated with the database query. The Cartesian join replacement unit 434 sequentially analyses each of the segments of the execution tree and determines whether executing one or more of the segments of the execution tree will result in Cartesian product joins. If the querying entity has chosen to avoid Cartesian product joins, the Cartesian join replacement unit 434 identifies tables to be joined and a referential constraint associated with the tables to be joined. The Cartesian join replacement unit 434 leverages the referential constraint to relate the two or more tables involved in the Cartesian product join. The Cartesian join replacement unit 434 can trigger a modification of the segments of the execution tree resulting in Cartesian product joins by leveraging relationships between the tables to be joined. For example, the Cartesian join replacement unit 434 can direct a query optimizer (not shown) to add, to a first execution step, additional execution steps to depict a relationship between the tables to be joined. The segment of the execution tree associated with the first execution step can also be modified to depict the relationship between the tables to be joined.

The ICH 424 connects and controls peripheral devices. In FIG. 4, the ICH 424 is connected to IDE/ATA drives 408 and to universal serial bus (USB) ports 410. The ICH 424 may also be connected to a keyboard 412, a selection device 414, firewire ports 416, CD-ROM drive 418, and a network interface 420. The ICH 424 can also be connected to a graphics controller 404. The graphics controller is connected to a display device 406 (e.g., monitor). In some embodiments, the computer system 400 can include additional devices and/or more than one of each component shown in FIG. 4 (e.g., video cards, audio cards, peripheral devices, etc.). For example, in some instances, the computer system 400 may include multiple processors, multiple cores, multiple external CPU's. In other instances, components may be integrated or subdivided.

Figure 5:
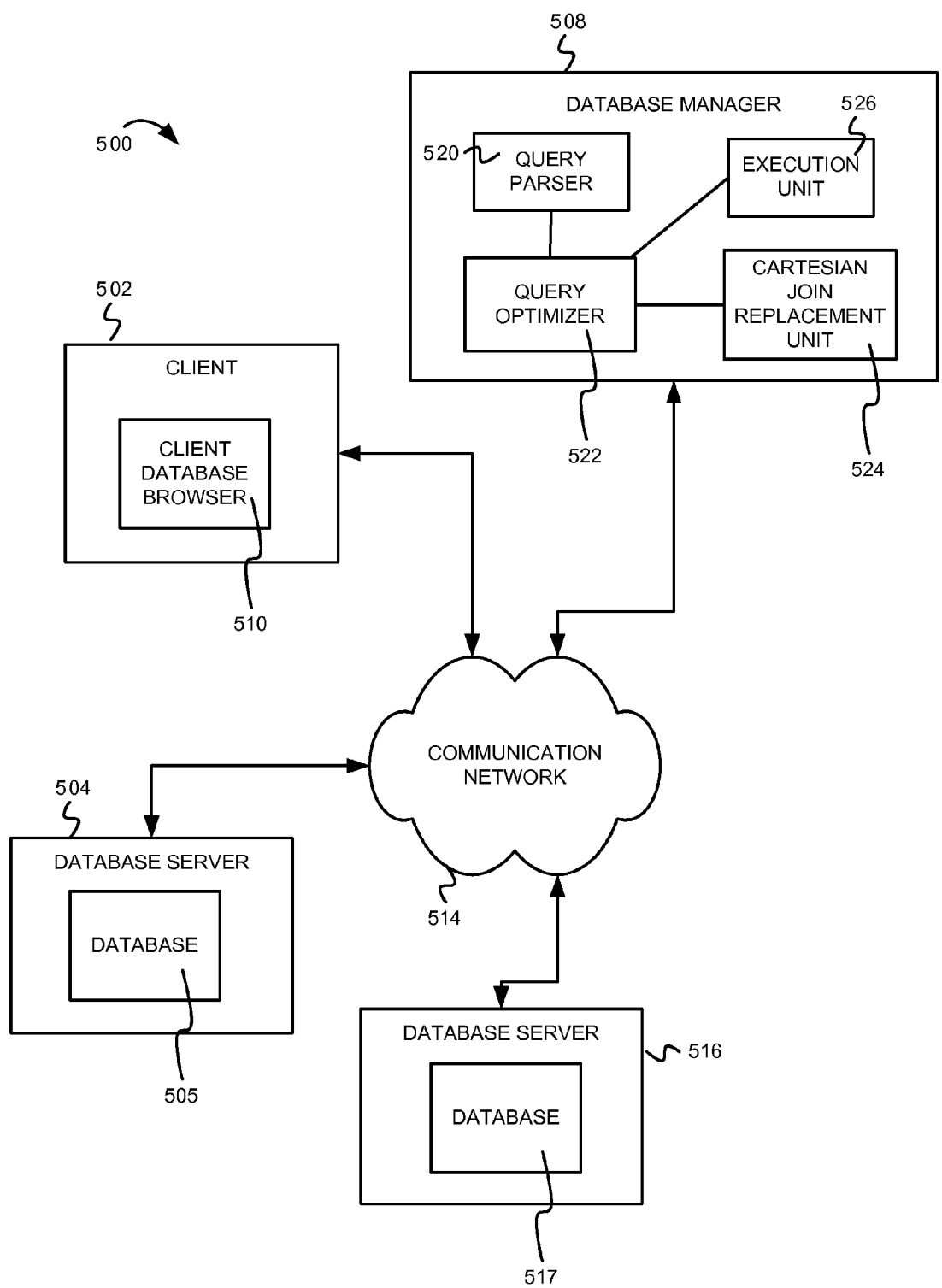
FIG. 5 is an example block diagram configured to detect and avoid Cartesian product joins in database queries.

FIG. 5 is an example block diagram configured to detect and avoid Cartesian product joins in database queries. The system 500 comprises a database manager 508, a client 502, and database servers 504 and 516. The database manager 508 comprises a query parser 520, a query optimizer 522, a Cartesian join replacement unit 524, and an execution unit 526. The query optimizer 522 is coupled with the query parser 520, the Cartesian join replacement unit 524, and the execution unit 526. The database servers 504 and 516 comprise one or more databases. The database server 504 comprises database 505 and the database server 516 comprises database 517. The databases may be implemented using any suitable database model (e.g., relational model, hierarchical model, etc.) or a combination of database models. The client 502 comprises a client database browser 510 (e.g., an SQL server client). Any one of the database manager 508, the database servers 504 and 516, and the client 502 can be embodied as the computer system 400 of FIG. 4.

A user can enter a database query, comprising one or more query statements, on the client database browser 510. The user may type out a database query or may select one or more graphical objects (e.g., buttons indicating operations, tables, in the databases, etc.) to graphically represent the database query. The client database browser 510 transmits the database query to the database manager 508. In some implementations, the database manager 508 may be part of the client 502. The database manager 508 receives the database query and implements functionality described in accordance with FIGS. 1-4. The query parser 520 determines whether the received database query is syntactically accurate, while the query optimizer 522 generates segments of an execution tree associated with the database query's execution steps. The Cartesian join replacement unit 524 analyses each segment of the execution tree and determines whether execution of the segment of the execution tree will result in a Cartesian product join. The Cartesian join replacement unit 524 also determines whether operations to avoid detected Cartesian product joins are enabled.

The Cartesian join replacement unit 524 also identifies and leverages a referential constraint (e.g., a foreign key, a primary key, etc.) relating the tables to be joined to simplify execution of the detected Cartesian product join. The tables to be joined may be part of a single database (e.g., database 517) or may be parts of different databases (e.g., a first table may be associated with database 517 and a second table may be associated with database 505). The Cartesian join replacement unit 524 can update (or direct the query optimizer 522 to update) the execution tree to leverage the referential constraint relating the tables to be joined. After each segment of the execution tree has been analyzed and the execution tree has been modified (where possible) to avoid Cartesian product joins, the modified execution tree is transmitted to the execution unit 526. The execution unit 526 executes the database query in accordance with the modified execution tree.

The client database browser 510 may be used to globally (or selectively) enable or disable operations to detect and avoid Cartesian product joins. Additionally, the client database browser 510 can be used configure the database manager's response to error events as described with reference to FIG. 2 (See description of block 224 in FIG. 3).

The database manager 508, the database servers 504 and 516, and the client 502 communicate via a communication network 514. The database manager 508 may communicate with the database servers 504 and 516 to retrieve data from one or more databases using database communication protocols. For example, the database manager 508 can employ an SQL communication protocol to retrieve data from relational databases and execute SQL queries. As another example, the database manager 508 can employ any proprietary database communication protocol to retrieve data and execute the database query. The communication network 514 can include any technology suitable for passing communication between the database manager 508, the client 502, and the database servers 504 and 516 (e.g., Ethernet, IEEE 802.11n, SONET, etc). Moreover, the communication network 514 can be part of other networks, such as cellular telephone networks, public-switched telephone networks (PSTN), cable television networks, etc. Additionally, the database manager 508, the client 502, and the database servers 504 and 516 can be any suitable devices capable of executing software in accordance with the embodiments described herein. Also, although depicted as being implemented on a distinct computer system, the database manager 508 may be implemented on one or more of the database servers 504 and 516 and a standalone server configured for controlling data accesses to the database servers 504 and 516. In some implementations, the database manager 508 may also be implemented on the client 502. Also, in some implementations, the databases 505 and 517 along with the database manager 508 may be implemented on a single computer system. The database manager 508 may also comprise one or more other units not shown in FIG. 5. For example, instead of the query optimizer 522 generating and modifying the execution tree, an execution tree generation unit may generate or modify the execution tree. The database manager 508 may be implemented as a chip, plug-in, code in memory, etc.

Lastly, although FIGS. 1-5 refer to an execution tree being generated to denote steps for executing the received database query, any suitable execution data structure can be generated. For example, an execution data structure may be generated in the form of a table, an XML file, a structure linked to one or more database tables, etc. As another example, the execution data structure may be generated in a tabular format, a plain text format, or other suitable format. Also, although FIGS. 1-5 refer to data being stored in database tables and query operations being performed on the database tables, it should be noted that the data could be retrieved, processed, and stored in any suitable data source. For example, data can be retrieved from or stored in an XML database, a plain-text file, an RDF data store, a graph, etc.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for automatically avoiding Cartesian product joins as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining that a Cartesian product join should be automatically avoided for a database query;
   beginning construction of an execution data structure that indicates how to implement the database query on a database;
   while constructing the execution data structure, determining that implementing the database query in accordance with a current state of the execution data structure will result in a Cartesian product join;
   determining whether a referential constraint between data sources indicated in the database query can be identified;
   in response to identifying a first referential constraint between the data sources indicated in the database query, modifying the current state of the execution data structure to leverage the identified first referential constraint to avoid the Cartesian product join; and
   completing construction of the execution data structure with the modified current state of the execution data structure; and
   in response to identifying the first referential constraint and a second referential constraint between the data sources indicated in the database query,
   generating two versions of the execution data structure, wherein a first version of the execution data structure leverages the first referential constraint between the data sources, and wherein a second version of the second execution data structure leverages the second referential constraint between the data sources.

2. The method of claim 1, wherein the execution data structure comprises one of an execution tree structure and a set of one or more execution steps in a tabular format.

3. The method of claim 1, wherein the first referential constraint between the data sources comprises one or more of a primary key and a foreign key.

4. The method of claim 1, wherein the determining that a Cartesian product join should be automatically avoided for the database query comprises determining whether a flag associated with one or more of the data sources indicated in the database query is set.

5. The method of claim 1, further comprising:
   determining that a Cartesian product join should not be avoided for a second database query;
   beginning construction of a second execution data structure that indicates how to implement the second database query on the database;
   while constructing the second execution data structure, determining that implementing the second database query in accordance with a current state of the second execution data structure will result in a Cartesian product join; and
   completing construction of the second execution data structure indicating that the second database query results in a Cartesian product join.

6. The method of claim 1, further comprising:
- determining that a Cartesian product join should be automatically avoided for a second database query;
- beginning construction of a second execution data structure that indicates how to implement the second database query on the database;
- while constructing the second execution data structure, determining that implementing the second database query in accordance with a current state of the second execution data structure will result in a Cartesian product join;
- identifying a third and a fourth referential constraints between data sources indicated in the second database query; and
- indicating an inability to execute the second database query based on said identifying the third and the fourth referential constraints.

7. The method of claim 6, wherein said indicating the inability to execute the second database query comprises one of:
- preventing execution of the second database query,
- completing construction of the second execution data structure without leveraging either the third or the fourth referential constraints, and
- modifying the current state of the second execution data structure to leverage either one of the third and the fourth referential constraints between the data sources based on either one of a random selection and a user selection of the third and the fourth referential constraints.

8. The method of claim 1, further comprising:
- determining that a Cartesian product join should be automatically avoided for a second database query;
- beginning construction of a second execution data structure that indicates how to implement the second database query on the database;
- while constructing the second execution data structure, determining that implementing the second database query in accordance with a current state of the second execution data structure will result in a Cartesian product join;
- determining that a third referential constraint between a second set of data sources indicated in the second database query does not exist; and
- indicating that the Cartesian product join in the second database query cannot be avoided.

9. The method of claim 8, wherein the indicating that the Cartesian product join in the second database query cannot be avoided comprises one of:
- preventing execution of the second database query, and
- completing construction of the second execution data structure without leveraging the third referential constraint.

10. Non-transitory machine readable storage media having stored therein a program product, which when executed by a processor unit causes the processor unit to perform operations that comprise:
- determining that a Cartesian product join should be automatically avoided for a database query;
- beginning construction of an execution data structure that indicates how to implement the database query on a database;
- while constructing the execution data structure, determining that implementing the database query in accordance with a current state of the execution data structure will result in a Cartesian product join;
- determining whether a referential constraint between data sources indicated in the database query can be identified;
- in response to identifying a first referential constraint between the data sources indicated in the database query,
  - modifying the current state of the execution data structure to leverage the first identified referential constraint to avoid the Cartesian product join; and
  - completing construction of the execution data structure with the modified current state of the execution data structure; and
- in response to identifying the first referential constraint and a second referential constraint between the data sources indicated in the database query,
  - generating two versions of the execution data structure, wherein a first version of the execution data structure leverages the first referential constraint between the data sources, and wherein a second version of the second execution data structure leverages the second referential constraint between the data sources.

11. The machine-readable storage media of claim 10, wherein said operation for determining that a Cartesian product join should be automatically avoided for the database query comprises determining a status of a flag associated with one or more of the data sources indicated in the database query.

12. The machine-readable storage media of claim 10, wherein the operations further comprise:
- determining that a Cartesian product join should not be avoided for a second database query;
- beginning construction of a second execution data structure that indicates how to implement the second database query on the database;
- while constructing the second execution data structure, determining that implementing the second database query in accordance with a current state of the second execution data structure will result in a Cartesian product join; and
- completing construction of the second execution data structure indicating that the second database query results in a Cartesian product join.

13. The machine-readable storage media of claim 10, wherein the operations further comprise:
- determining that a Cartesian product join should be automatically avoided for a second database query;
- beginning construction of a second execution data structure that indicates how to implement the second database query on the database;
- while constructing the second execution data structure, determining that implementing the second database query in accordance with a current state of the second execution data structure will result in a Cartesian product join;
- identifying a third and a fourth referential constraints between data sources indicated in the second database query; and
- indicating an inability to execute the second database query based on said identifying the third and the fourth referential constraints.

14. The machine-readable storage media of claim 13, wherein said operation for indicating the inability to execute the second database query comprises one of:
- preventing execution of the second database query,
- completing construction of the second execution data structure without leveraging either the third or the fourth referential constraints, and
- modifying the current state of the second execution data structure to leverage either one of the third and the fourth referential constraints between the data sources based on either one of a random selection and a user selection of the third and the fourth referential constraints.

15. The machine-readable storage media of claim 10, wherein the operations further comprise:
determining that a Cartesian product join should be automatically avoided for a second database query;
beginning construction of a second execution data structure that indicates how to implement the second database query on the database;
while constructing the second execution data structure, determining that implementing the second database query in accordance with a current state of the second execution data structure will result in a Cartesian product join;
determining that a third referential constraint between a second set of data sources indicated in the second database query does not exist; and
indicating that the Cartesian product join in the second database query cannot be avoided.

16. The machine-readable storage media of claim 15, wherein said operation of indicating that the Cartesian product join in the second database query cannot be avoided comprises one of:
preventing execution of the second database query, and
completing construction of the second execution data structure without leveraging the third referential constraint.

17. An apparatus comprising:
a processor;
a network interface coupled with the processor;
a set of one or more data sources operable for hosting data; and
a Cartesian join replacement unit configured to:
determine that a Cartesian product join should be automatically avoided for the database query;
begin construction of an execution data structure that indicates how to implement the database query on a database;
determine, while constructing the execution data structure, that implementing the database query in accordance with a current state of the execution data structure will result in a Cartesian product join;
determine whether a referential constraint between data sources indicated in the database query can be identified;
in response to identifying a first referential constraint between the data sources indicated in the database query,
modify the current state of the execution data structure to leverage the first identified referential constraint to avoid the Cartesian product join; and
complete construction of the execution data structure with the modified current state of the execution data structure; and
in response to identifying the first referential constraint and a second referential constraint between the data sources indicated in the database query,
generate two versions of the execution data structure, wherein a first version of the execution data structure leverages the first referential constraint between the data sources, and wherein a second version of the second execution data structure leverages the second referential constraint between the data sources.

18. The apparatus of claim 17, wherein the first referential constraint between the data sources comprises one or more of a primary key and a foreign key.

19. The apparatus of claim 17, wherein the Cartesian join replacement unit comprises at least one machine-readable storage media.

20. The method of claim 1, wherein the execution data structure comprises a plurality of edges that connect a plurality of table representations and wherein said determining that implementing the database query in accordance with the current state of the execution data structure will result in a Cartesian product join comprises one of:
determining that a weight associated with a first of the plurality of edges that connects a first table representation and a second table representation exceeds a predetermined threshold weight;
determining that a number of the plurality of edges that connects the first table representation and the second table representation in the execution data structure exceeds a predetermined threshold number of edges; and
determining that one or more attributes of a first of the plurality of edges that connects the first table representation and the second table representation in the execution data structure exceeds a corresponding one or more predetermined attribute threshold values.

* * * * *